United States Patent [19]

Ranke et al.

[11] Patent Number: 4,668,488
[45] Date of Patent: May 26, 1987

[54] PROCESS FOR THE TREATMENT OF GASES INCURRED IN THE MANUFACTURE OF PHOSPHORUS

[75] Inventors: Gerhard Ranke, Poecking; Heinz Karwat, Pullach, both of Fed. Rep. of Germany

[73] Assignee: Linde Aktiengesellschaft, Fed. Rep. of Germany

[21] Appl. No.: 791,128

[22] Filed: Oct. 24, 1985

Related U.S. Application Data

[63] Continuation-in-part of Ser. No. 573,254, Jan. 23, 1984, abandoned.

[30] Foreign Application Priority Data

Jan. 26, 1983 [DE] Fed. Rep. of Germany ....... 3302561

[51] Int. Cl.4 .................... B01D 47/00; B01D 51/00; B01J 8/00; F25J 3/00
[52] U.S. Cl. .................... 423/210; 423/220; 423/415 A; 55/23; 62/11; 62/12
[58] Field of Search ............. 423/210, 220, 415 A; 55/23; 62/11, 12

[56] References Cited

U.S. PATENT DOCUMENTS

| | | | |
|---|---|---|---|
| 3,236,057 | 2/1966 | Hasheni-Tatreshi | 62/12 |
| 3,340,695 | 9/1967 | Ichihara | 62/12 |
| 4,159,201 | 6/1979 | Staege | 423/415 A X |
| 4,169,133 | 9/1979 | Staege | 423/220 X |
| 4,175,111 | 11/1979 | Monday et al. | 423/415 A X |
| 4,185,079 | 1/1980 | Monday et al. | 423/415 A X |

Primary Examiner—Gregory A. Heller
Attorney, Agent, or Firm—James C. Wray

[57] ABSTRACT

Process for the treatment of CO-rich gases incurred in the manufacture of phosphorus, which gases contain impurities like water, and compounds of sulfur, nitrogen and phosphorus. The gas is passed through regenerators for the purpose of removing impurities. In this manner, a product gas is obtained from which impurities have been condensed or frozen.

8 Claims, 1 Drawing Figure

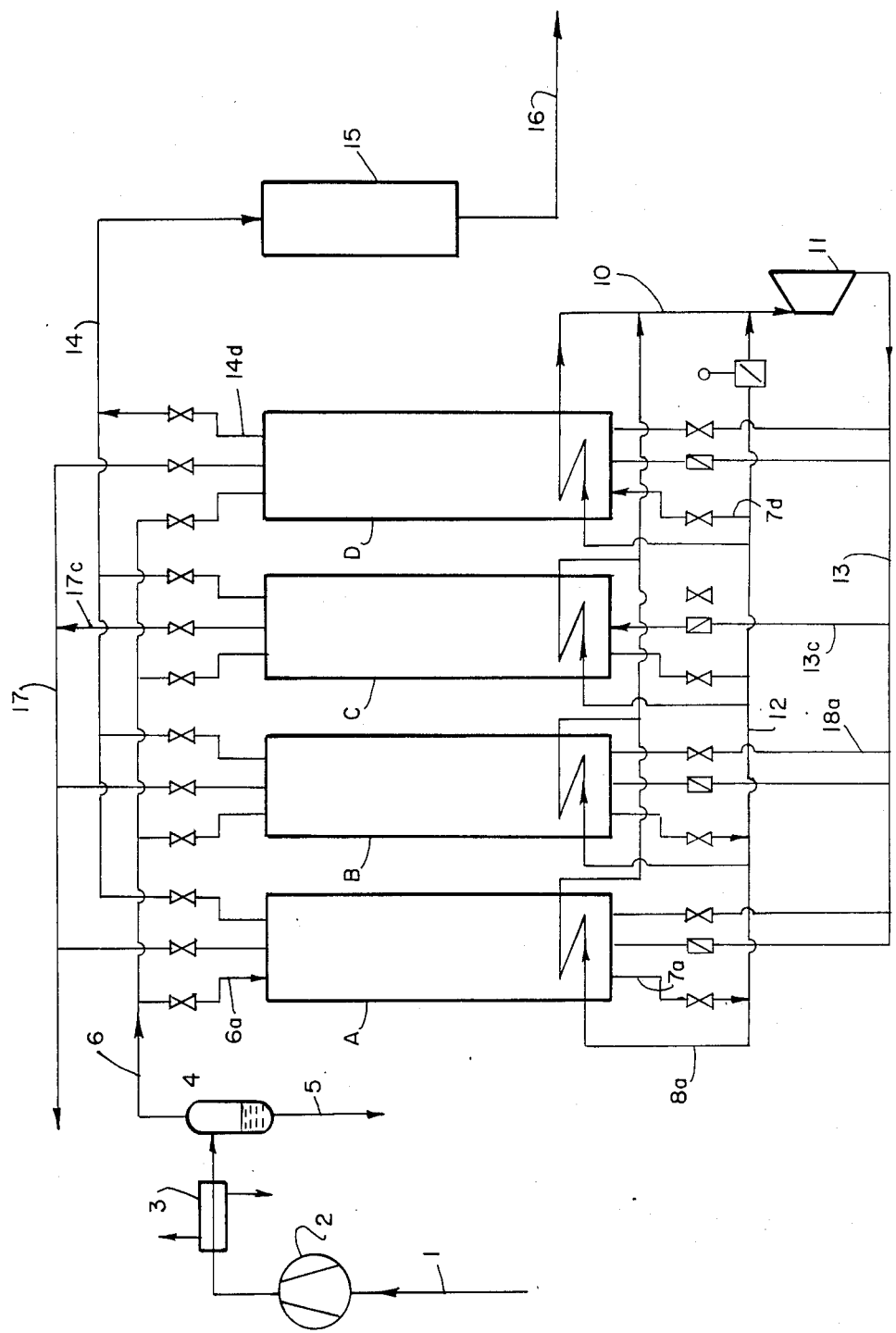

PROCESS FOR THE TREATMENT OF GASES INCURRED IN THE MANUFACTURE OF PHOSPHORUS

This is a continuation-in-part of Ser. No. 573,254 filed Jan. 23, 1984, now abandoned.

BACKGROUND OF THE INVENTION

The invention relates to a process for treatment of CO-rich gases incurred in the manufacture of phosphorous, which contain impurities like water, sulfur compounds, nitrogen compounds and phosphorus compounds.

Large-scale elementary phosphorous manufacture uses an electric arc with coke and gravel to convert apatites or phosphorites (e.g. Ullmann's Encyclpedia of Industrial Chemistry, 1979, Volume 18, pp. 288–292.) After leaving the converter, the waste gases pass through an electrostatic gas purification system in which approximately 98% to 99% of the dust particles are deposited. The gas primarily contains CO, but also contains impurities like sulfur compounds, nitrogen compounds, phosphorus compounds and carbon dioxide due to secondary reactions in the furnace. In the conventional process, the gas substantially freed of dust, is now introduced into a condensation system. Subsequently, the gas is directly cooled with water to facilitate phosphorus extraction from the gas stream to the greatest possible extent. The waste gas still contains phosphorous corresponding to the temperature of the process water. However, this process does not permit a very thorough cleaning of the gas as the solubilities of the impurities contained therein are too different. For instance, the poor solubilities of phosphine and phosphorous prohibits a simple cleaning by a physical scrub.

It is known to convert phosphorus and phosphorus compounds with concentrated sulfuric acid but this process entails formation of other components, as for instance, sulfur dioxide which is undesirable and in further reuse may cause water waste and environmental problems. Thus, after the sulfuric acid scrub, in which the phosphorus components are removed, another scrub for removal of existing and newly formed acid components is necessary.

Due to the complex and costly purification of such gases, it has been preferred practice up to now, to use combustion for disposal of such gases whereby the phosphorus and sulfur components caused environmental pollution. Also, in most cases, combustion of CO is unsatisfactory from an economic standpoint as there is a demand for CO, and obtaining CO by conversion of hydrocarbons (e.g. natural gas, naptha or coal) is a costly process.

It is the objective of the invention to present a process which treats CO rich gases incurred in the manufacture of phosphorus, which contain impurities like water, sulfur compounds, nitrogen compounds and phosphorus compounds in simple and cost-effective manner, thus simultaneously permitting product recovery of CO without incurring environmentally harmful byproducts.

It is another object of the invention to provide a process for the recovery of purified CO from CO-rich gases yielded during production of phosphorus, the CO-rich gases containing impurities consisting essentially of $H_2O$, $H_2$, $N_2$, $O_2+Ar$, $CH_4$, $PH_3$, $CO_2$, COS, $H_2S$, HCN, and $P_4$, comprising; cooling the CO-rich gases in regenerators to separate the impurities from a CO product stream, wherein the impurities are frozen or condensed within the generators, and withdrawing from the regenerators a CO product stream, wherein the steps of cooling and withdrawing further comprise passing the CO-rich gases through a first generator, wherein the impurities are frozen or condensed and a cold CO product stream is withdrawn, and wherein the first regenerators is pressurized, expanding a second regenerator to remove CO product stream generated from a previous step of passing CO-rich gases therethrough, and separating a partial CO product stream from the CO product stream, cooling a third regenerator by passing the cold CO product stream therethrough, wherein the CO product stream is recovered after passing through the third regenerator, and purging a fourth regenerator with the partial CO product stream after passing the partial CO product stream through an expansion turbine to lower the temperature of the partial CO product stream, and cyclically repeating the above steps so that each regenerator undergoes, in order, the steps of passing through the CO-rich gases, then expanding, then cooling, and then purging.

SUMMARY OF THE INVENTION

The process of the invention achieves this objective by passing the gases through regenerators for separating the impurities.

It was found that separation of all occurring trace elements can be accomplished in regenerators. In particular, phosphorus and phosphine compounds can be separated.

Advantageously, the gases to be purified are passed to a regenerator and cooled to a point where the impurities are condensed or frozen and a product stream can be withdrawn at the cold end. Moreover, in a further process step, the previously laden regenerator is expanded and subsequently is purged for the purpose of removing the deposited impurities, and thereafter is cooled.

Advantageously, a portion, specifically 15%–35%, and preferably, 18%–25% of the product stream can be diverted, after partial heating, and used as a purge gas. In this manner, approximately 80% of the CO can be extracted as a product stream.

In further developing the thought of the invention, it is provided that the purge gas, containing the deposited impurities, is at least partially added to the gas to be purified, thus reducing CO losses by the purge gas.

According to another variation of the process, the gases are condensed and cooled before introduction into the regenerators. However, the gases should not be cooled to a temperature below the melting point of phosphorus. Therefore, cooling to temperatures between 45°–60° C., preferably between 50°–55° C., is advantageous.

According to another variation of the inventive process, the product stream is subjected to a downstream fine cleaning. For this purpose, a chemical wash or an absorption process can be applied. As utilization of the regenerator has removed the major portion of the impurities from the gases, a considerable saving in chemicals is realized for the fine cleaning.

Moreover, it has been found that the gases can be passed through reversible exchangers for separation of the impurities with the same results.

The product recovered by the process of the invention can be applied in a variety of processes, e.g. Methanol synthesis, acetic acid synthesis or oxo synthesis, and manufacture of phosgene.

The following example further illustrates the process of the invention by way of a schematic drawing.

BRIEF DESCRIPTION OF THE DRAWING

EXAMPLE 18,000 Nm³/h of gas to be purified flow via line 1 towards the purification plant. The gas has a temperature of about 55° C. and a pressure of about 200 mm WS and in dry state has the following composition:
$H_2$: 0.9% by mol.
$N_2$: 0.82% by mol.
CO: 97.9% by mol.
$O_2 + Ar$: 0.006% by mol.
$CH_4$: 0.2% by mol.
$PH_3$: 0.0215% by mol.
$CO_2$: 0.07% by mol.
COS: 0.0004% by mol.
$H_2S$: 0.0011% by mol.
HCN: 0.05% by mol.
$P_4$: 0.031% by mol.

"WS" is an abbreviation for "Wassersaule", which means "water column", and is a commonly recognized measurement of pressure in units of water height. For conversion, one millimeter $WS = 0.098 \times 10^{-4}$ bar $= 1.4223 \times 10^{-3}$ pounds per square inch (PSI). The gas is saturated with water vapor (approximately 90 g $H_2O$fm gas). The gas is brought to an elevated pressure of approximately 6 bar in compressor 2 and is cooled to approximately 53° C. against cooling water in heat exchanger 3. Condensates are withdrawn from separator 4 via line 5. The gases enter the purification system via lines 6 and 6a respectively. This system consists of four reversing exchangers, e.g. Revex, or, as described in the following example, regenerators A, B, C and D. The gases are cooled to approximately 168° C. in regenerator A which condenses or freezes all or substantially all impurities so that CO may be withdrawn as product stream at the cold end via line 7a. A smaller portion of this product stream is passed to coiled pipes 9a in regenerator A via line 8a for partial heating, and subsequently is passed to expansion turbine 11 via line 10, and then is expanded in work-effective manner to a pressure of approximately 2 bars together with approximately 20% of the product stream from line 12. The partial stream passing through the turbine generates the required cold and subsequently is uilized via lines 13 or 13c for purging out of the deposited components from regenerator C.

The main portion, approximately 80% of the product stream, flows back through regenerator D via line 7d and thereby cools its charge to the temperature required. CO is withdrawn as product via line 14d and via line 14 may be subjected to fine cleaning 15 and finally can be withdrawn via line 16 for further use.

The gas in regenerator B is still under pressure from the preceding cycle may by gradual expansion is now released at the cold end through line 18a. Together with the purge gas, it flows from expansion turbine 11 through regenerator C.

In reference to the drawing, each of the four regenerators has three lines at the top and three lines at the bottom. For each, the top left line is used to introduce waste gas into the regenerator for "passing through". A product stream is withdrawn from the bottom left line. Since the regenerator being passed through has been substantially cooled in a preceding step, the product stream will likewise be extremely cold. When the cooled product stream is passed back through one of the other regenerators, the cool temperature of the product stream is transfered to the other regenerator. For the purpose of passing back through, the bottom left line is again used.

In each regenerator, the top and bottom center lines (i.e., 13c, 17c) are used to introduce purging gas and remove purging gas and purged materials.

In each regenerator, the top right line is used to remove the product stream after passing back through a regenerator, (for instance, 14d).

In each regenerator, the bottom right line, 18a, is used for the gradual expansion of gas, after the preceding step of passing through.

The process of the present invention involves cyclically repeating four cycle phases.

In one cycle phase, regenerator A cools and condenses impurities by passage through of gases containing impurities, thereby providing a cooled CO product stream, which is removed via line 7a. Simultaneously, a partial product stream is separated from the product stream, which is removed via line 7a. Simultaneously, a partial product stream is separated from the product stream and passed through expansion turbine 11, which cools the partial product stream before it is used to purge rgenerator C. Also, the product stream passes through regenerator D through line 7d and the product stream is removed through line 14d. The passage of the cooled CO product stream through regenerator D cools the regenerator in preparation for the next cycle phase. Meanwhile, regenerator B is expanded, i.e., gas left over from the previous cycle phase is released by gradual expansion through line 18a. In summary of the first phase of the cycle, A is passed through by waste gas, B is expanded, C is purged, and D is passed through by a CO product stream.

In the next phase of the cycle, after about four minutes, A is expanded, B is purged, C is passed through by a CO product stream, and D is passed through by waste gases.

In the next phase of the cycle, A is purged, B is passed through by a CO product stream, C is passed by waste gases, and D is expanded.

In the last phase, A is passed through by a CO product stream, B is passed through by waste gases, C is expanded, and D is purged.

Operation of the process involves cyclically repeating the above phases such that each regenerator undergoes in sequence the steps of passing through of waste gases, expanding, purging, and passing through of a CO product stream.

We claim:

1. Process for the recovery of purified CO from CO-rich gases yielded during production of phosphorus, the CO-rich gases containing impurities consisting essentially of $H_2O$, $H_2$, $N_2$, $O_2 + Ar$, $CH_4$, $PH_3$, $CO_2$, COS, $H_2S$, HCN, and $P_4$, comprising;
    cooling the CO-rich gases in regenerators to separate the impurities from a CO product stream, wherein the impurities are frozen or condensed within the regenerators, and
    withdrawing from the regenerators a CO product stream, wherein the steps of cooling, and withdrawing further comprise
    (A) passing the CO-rich gases through a first regenerators, wherein the impurities are frozen or condensed and a cold CO product stream is withdrawn, and wherein the first generator is pressurized, (B) expanding a second regenerator to remove CO product stream generated from a previous step of passing CO-rich gases therethrough, and separating a partial CO product stream from the CO product stream, (C) cooling a third regenerator by passing the cold CO product stream therethrough, wherein the CO product stream is recovered after passing through the third regenerator, and (D) purging a fourth regenerator with the partial CO product stream after passing the partial CO product stream through an expansion turbine to lower the temperature of the partial CO product stream, and cyclically repeating the above steps so that each regenerator undergoes, in order, the steps of passing through the CO-rich gases, then expanding, then cooling, and then purging.

2. The process of claim 1 further comprising, passing the CO product stream through a downstream final purification to remove impurities that were not removed in the previous steps.

3. The process of claim 2, wherein the downstream final purification comprises a chemical wash.

4. The process of claim 1 further comprising cooling and compressing the waste gases prior to introduction into the regenerators to a temperature of approximately 53° C. and a pressure of approximately 6 bar.

5. The process of claim 1 wherein gases removed in step (B) are added to the partial CO product stream for purging.

6. The process of claim 1 wherein the partial CO product stream is approximately 20% of the CO product stream.

7. The process of claim 1 wherein the partial CO product stream is between 15-35 percent of the CO product stream.

8. The process of claim 1 further comprising pre-cooling the CO-rich gases with heat exchangers to a temperature between 46 and 60 degrees Centigrade prior to cooling in regenerators.

* * * * *